(12) United States Patent
Jang et al.

(10) Patent No.: US 8,429,100 B2
(45) Date of Patent: Apr. 23, 2013

(54) METHOD FOR BUILDING ADAPTIVE SOFT SENSOR

(75) Inventors: Shi-Shang Jang, Hsinchu (TW); Tain-Hong Pan, Zhenjiang (CN); Shan-Hill Wong, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 212 days.

(21) Appl. No.: 12/948,182

(22) Filed: Nov. 17, 2010

(65) Prior Publication Data
US 2011/0295777 A1    Dec. 1, 2011

(30) Foreign Application Priority Data
Jun. 1, 2010    (TW) ................................ 99117719 A

(51) Int. Cl.
*G06N 5/25*    (2006.01)
(52) U.S. Cl.
USPC ............................................ 706/12; 374/116
(58) Field of Classification Search .................... None
See application file for complete search history.

(56) References Cited

U.S. PATENT DOCUMENTS

| | | | |
|---|---|---|---|
| 6,243,696 B1 | 6/2001 | Keeler et al. | |
| 6,546,379 B1 | 4/2003 | Hong et al. | |
| 7,505,949 B2 | 3/2009 | Grichnik | |
| 2010/0036780 A1* | 2/2010 | Angelov | 706/12 |

* cited by examiner

*Primary Examiner* — Kakali Chaki
*Assistant Examiner* — Mario Riojas Ramirez
(74) *Attorney, Agent, or Firm* — WPAT, P.C.; Anthony King

(57) ABSTRACT

The invention discloses a method for building adaptive soft sensor. The method comprises the following steps. The input and schedule vectors are constructed, and a novel learning algorithm that uses online subtractive clustering is used to recursively update the structure and parameters of a local model network. Three rules are proposed for updating centers and local model coefficients of existing clusters, for generating new clusters and new models as well as for merging existing clusters and their corresponding models. Once verified, the online inferential model can be created to generate the predicted value of process. Thus, it does not need much memory space to process the method and can be easily applied to any other machine.

6 Claims, 10 Drawing Sheets

---

- S11: operating an online subtractive cluster algorithm to divide online data into a plurality of local regions according to a schedule vector, using an input vector to construct an inferential model according to the local regions
- S12: converting the online subtractive cluster algorithm into a recursive regression algorithm
- S13: updating parts of existing clusters, adding new clusters, or merging two nearest clusters according to a density function of the schedule vector based on the online subtractive cluster algorithm
- S14: operating the recursive regression algorithm to update the inferential model into a plurality of local linear models according to the local regions
- S15: obtaining a predicted output value by weighting the local models to create the inferential model

METHOD FOR BUILDING ADAPTIVE SOFT SENSOR

FIELD OF THE INVENTION

The present invention relates to a method for building an adaptive soft sensor, and more particularly to a method for building an adaptive soft sensor, which uses a recursive regression algorithm to predict output values of an industrial process.

BACKGROUND OF THE INVENTION

A soft sensor is an inferential model that uses software techniques to estimate the value of a process quality variable using process sensor measurements. Inferential model may be built by using various data-driven methods such as: principle component regression (PCR), partial least squares (PLS), artificial neural network (ANN), support vector machines (SVM), neuro-fuzzy systems (NFS), etc.

It is well known that all those inferential models are built offline by training data which collected from processes. In certain situations, those training data cannot cover the entire input domains. If new situations arise, the building process has to be reactivated.

Techniques such as recursive PCR/PLS, adaptive PCR based on moving windows, exponential weighted PLS, and time-lagged PCR, may be used to overcome this problem. However, in all these adaptive approaches, a window of recent operating data must be memorized, and past experiences are lost as the process evolves and the model is updated.

U.S. Pat. No. 6,546,379 discloses a cascade boosting method for boosting predictive models for resolving the interpretability problem of previous boosting methods and mitigating the fragmentation problem when applied to decision trees. However, this method may cause coarse transitions from the large number of models. These coarse transitions may reduce the accuracy of the overall predictive model and may also cause confusion for the users of the overall predictive models.

U.S. Pat. No. 7,505,949 discloses a process model error correction method by integrating two models to generate the desired values of the plurality of the output parameters. This method is disadvantageous in that: it needs a lot of memory to save the data from process; and the online computational burden is large enough.

U.S. Pat. No. 6,243,696 discloses an online model to generate the predicted value for transferring to the control system. However, this algorithm also needs a historical database. On the other hand, it needs to check whether the variables' names are still valid when the system is running. If not, it is necessary to rewrite the various variables to the database.

In summarization of the foregoing description, the methods as described in the above-mentioned patents either require relatively large temporary storage space, or cannot be referenced from the required parameters in previous manufacturing processes, or cannot be used to effectively combine predicted data and actual data. Hence, there is an urgent need for a method capable of predicting output values of industrial processes and being referenced from previous and next output values by regression analysis.

SUMMARY OF THE INVENTION

A method for building an adaptive soft sensor is disclosed. In this method, an online learning algorithm for developing a novel soft sensor based on local model network (LMN) is proposed. A subtractive cluster is adopted to determine the number of clusters required, and the parameters of the local models were identified recursively. Only the center, covariance matrix, and parameters of the local model need to be stored as knowledge in the model.

In view of the above-mentioned problems of the prior art, an object of the present invention is to provide a method for building an adaptive soft sensor, which solves the problem that the previous and next output values cannot be effectively referenced and used when output values are generated from the measurement results from industrial and manufacturing processes.

According to an object of the present invention, there is provided a method for building an adaptive soft sensor. The method for building an adaptive soft sensor comprises the following steps: operating an online subtractive cluster algorithm to divide online data into a plurality of local regions according to a schedule vector, using input vectors to construct an inferential model according to the local regions, presenting three rules to update existing clusters, add new clusters, or merge two nearest clusters, operating a recursive regression algorithm to update local models corresponding to the local regions, and creating the inferential model by weighting the local models.

The schedule vector includes a sub set, wherein the sub set is constructed by read and normalized sampled-variables or sampled-variables of a system.

The recursive regression algorithm is a recursive least square algorithm.

The selected local model is updated by the recursive least square algorithm using the input vector.

The center, covariance matrix, and parameters of the local model are stored as knowledge in the inferential model.

The type of local model is linear.

The weight of the local model is determined by the distance between the center of the local region and the schedule vector.

As described above, the method for building an adaptive soft sensor according to the present invention may have one or more of the following advantages:

(1) This method for building an adaptive soft sensor features a recursive regression algorithm to update the predicted model with reference to previous output values or the latest output values of a process, thereby further improving the accuracy of predicting the outputs and reducing the number of online computations of an operating system.

(2) In accordance with the method for building an adaptive soft sensor, the most significant parameters in a process can be stored by adding, updating and merging clusters without consuming much memory to establish all the parameters.

DETAILED DESCRIPTION OF THE PREFERRED EMBODIMENTS

Figure 1:
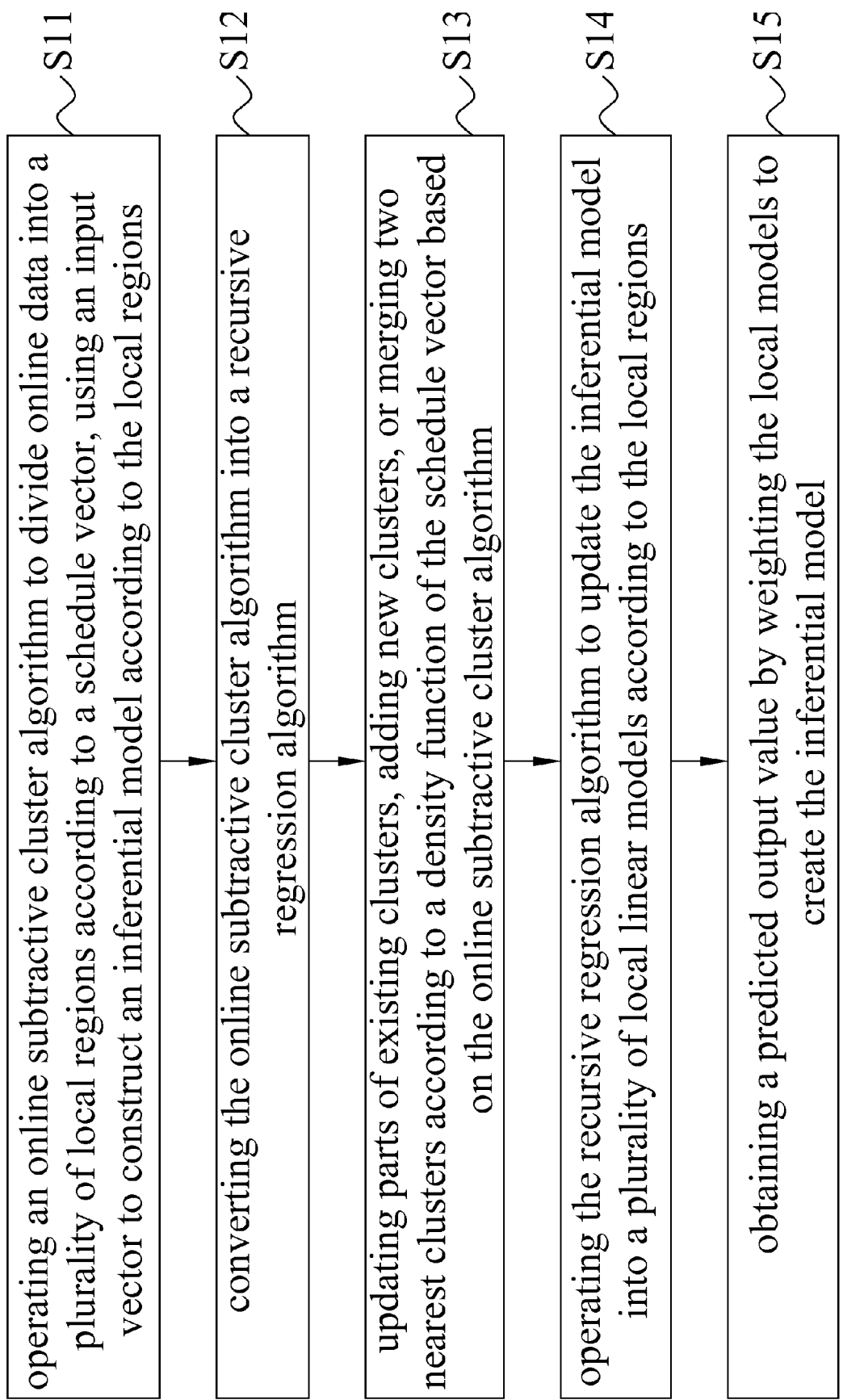
FIG. 1 illustrates a flow chart of a method for building an adaptive soft sensor according to the present invention.

Referring to FIG. 1, there is illustrated a flow chart of a method for building an adaptive soft sensor according to the present invention. In FIG. 1, a method for building an adaptive soft sensor 1 comprises the following steps:

(S11) operating an online subtractive cluster algorithm to divide online data into a plurality of local regions according to a schedule vector, using an input vector to construct an inferential model according to the local regions;

(S12) converting the online subtractive cluster algorithm into a recursive regression algorithm;

(S13) updating parts of existing clusters, adding new clusters, or merging two nearest clusters according to a density function of the schedule vector based on the online subtractive cluster algorithm;

(S14) operating the recursive regression algorithm to update the inferential model into a plurality of local linear models according to the local regions; and (S15) obtaining a predicted output value by weighting the local linear models to create the inferential model.

Figure 2:
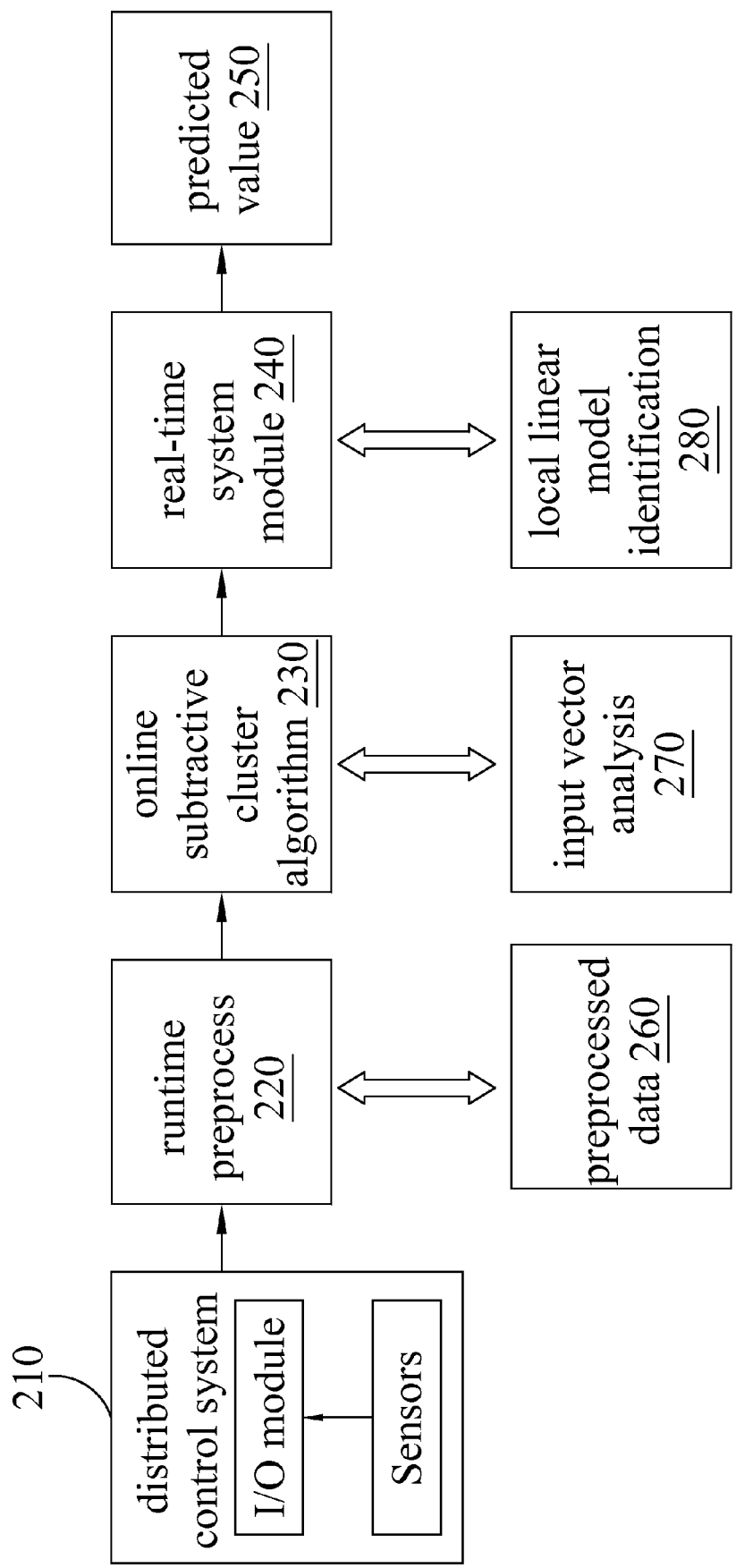
FIG. 2 illustrates a detailed flow chart of a method for building an adaptive soft sensor according to the present invention.

Referring to FIG. 2, there is illustrated a detailed flowchart of a method for building an adaptive soft sensor according to the present invention. A distributed control system (DCS) 210 collects various sampled-variables in a system or system variables such as temperature, flow rates, etc., as online data that form input vectors to an inferential model. The runtime preprocess 220 performs various preprocessing algorithms. This data is referred to as the raw data. The data may reflect characteristics of input parameters and output parameters. Once the data records are obtained, the runtime preprocess 220 may remove approximately identical data records and/or remove the data records that out of a reasonable range in order to be meaningful for model generation and optimization.

Figure 3:
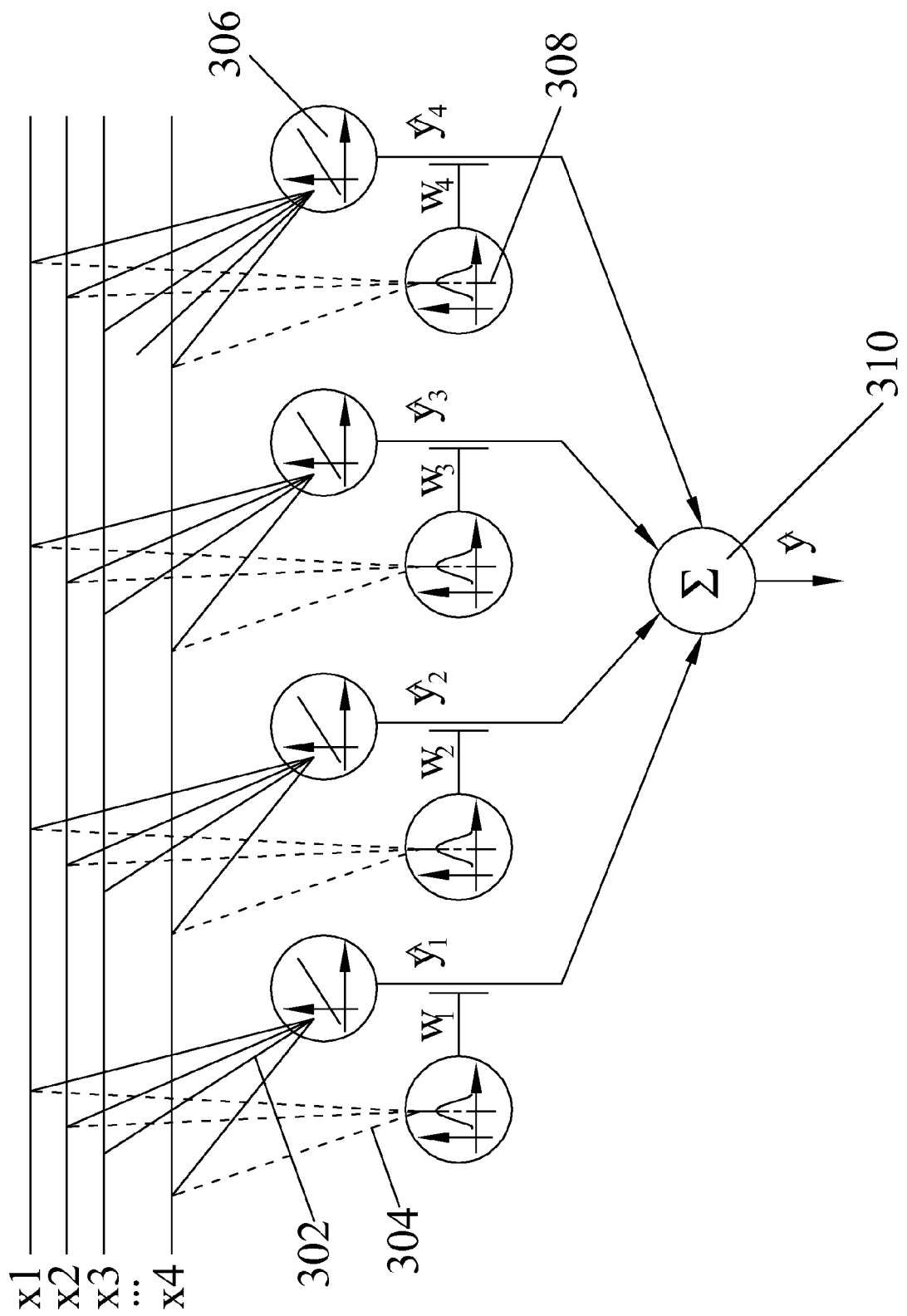
FIG. 3 illustrates a schematic view of predicted outputs of a process of a method for building an adaptive soft sensor according to the present invention.

Referring to FIG. 3, there is illustrated a schematic view of predicted outputs of a process of a method for building an adaptive soft sensor according to the present invention. In FIG. 3, the input vectors 302 are represented by X in the formulas and the schedule vectors 304 are represented by $\phi$ in the formulas, which are sub sets of the input vectors and are composed of the preprocessed data 260. Turning to FIG. 2, the online subtractive cluster algorithm 230 is converted into a recursive regression algorithm to calculate the density of the current schedule vector 304.

$$P_\Phi = \frac{\kappa - 1}{(k-1)(\gamma(\kappa)+1) - 2\eta(k)\phi(k) + \sigma(k)}$$

where k is a time interval, $\gamma(\kappa) = \phi(\kappa)^T \phi(\kappa)$, $$\eta(\kappa) = \sum_{j=1}^{\kappa-1} \phi(j)^T = \eta(k-1) + \phi(k-1)^T,$$

$$\sigma(\kappa) = \sum_{j=1}^{\kappa-1} \phi(j)^T \phi(j) = \sigma(k-1) + \phi(k-1)^T \phi(k-1)$$

Three rules are proposed to classify the current schedule vector $\phi$, respectively:

i) Rule I—Adding a New Cluster

If there is sufficient distance between the new datum and all existing centers, and the potential of the new datum is higher than the potential of the existing centers, then the new datum is accepted as a new center.

$$\text{IF } \min_{i=1,\ldots,n} \|\phi(k) - c_i\|_2 > r_1 \text{ AND } P_\phi(k) > \delta$$
$$\text{THEN } c_{n+1} = \phi(k) \text{ AND } P_{c_{n+1}}(k) = P_\phi(k)$$

This means that the current point has a more powerful description than other existing cluster center and a new operating regime or new condition appears.

ii) Rule II—Updating the Cluster Center

If the new datum is sufficiently close to the old center of the $i^{th}$ cluster, but has a higher potential than this old center, the old center is replaced by the new datum.

$$\text{IF } \min_{i=1,\ldots,n} \|\phi(k) - c_i\|_2 > r_1 \text{ AND } P_\phi(k) > \delta$$
$$\text{THEN } c_{n+1} = \phi(k) \text{ AND } P_{c_{n+1}}(k) = P_\phi(k)$$

Rule II means that the current point has a more powerful description than its old center, which indicates that the operating regime of the system has changed adaptively. Using a new cluster to denote this change could result in a lot of clusters, so the current datum should be used to replace this cluster center.

iii) Rule III—Merging Two Nearest Clusters

If two cluster centers are closer than a threshold, they will be merged as follows:

$$\text{IF } \min_{i \neq j; i, j=1,\ldots,n} \|c_i - c_j\|_2 \leq r_3$$
$$\text{THEN } \begin{cases} c_{d_1} = c_{d_2} \text{ AND } P_{d_1}(k) = P_{d_2}(k) \\ c_t = c_{t+1} \text{ AND } P_t(k) = P_{t+1}(k) \text{ for } t = d_3, \ldots, n \end{cases}$$

where $d_1 = \min(i,j)$, $d_2 = \operatorname{argmax}(P_{c_i}(k), P_{c_j}(k))$, and $d_3 = \max(i,j)$.

This means that the two nearest clusters should be merged into a new cluster. Using this strategy, the redundant cluster can be eliminated online and the cluster configuration can be maintained fairly compactly.

The local linear model identification 280 is provided with a standard recursive least square (RLS) algorithm to identify the local model. If those cluster centers are not merged, the local model can be updated by the input and output vectors corresponding to schedule vector which are classified by online subtractive cluster. Or else, two local models belong to the two nearest clusters are merged into one model.

$$V(k) = \left[ [V_i(k)]^{-1} + [V_j(k)]^{-1} \right]^{-1}$$
$$V(k) = \left[ [V_i(k)]^{-1} + [V_j(k)]^{-1} \right]^{-1}$$

$$\hat{\beta} = \left( [V_i(k)]^{-1} + [V_j(k)]^{-1} \right)^{-1} \left( [V_i(k)]^{-1} \hat{\beta}_i + [V_j(k)]^{-1} \hat{\beta}_j \right)$$

Turning to FIG. 3, the scheduling vector 304 is the subset of input vector 302. The type of local model 306 is linear and is responsible for a certain region of the input vector space. The ρ of the scheduling function 308 is a local validated function and may be defined as:

$$\rho_i(\phi(k)) = \exp\left[ -\frac{(\phi(k) - c_i)^T (\phi(k) - c_i)}{s_i^2} \right]$$

where $c_i$ is the center of the $i^{th}$ cluster. The weight value of local linear model may be calculated as:

$$w_i = \frac{\rho_i(\phi(k))}{\sum_{i=1}^{n} \rho_i(\phi(k))}$$

The predicted output value ŷ(k) can be estimated by weighting local linear models 310:

$$\hat{y}(k) = \sum_{i=1}^{n} w_i \hat{y}_i(k)$$

In order to describe the algorithm in detail, an industrial o-xylene distillation column is taken as an example.

Figure 4:
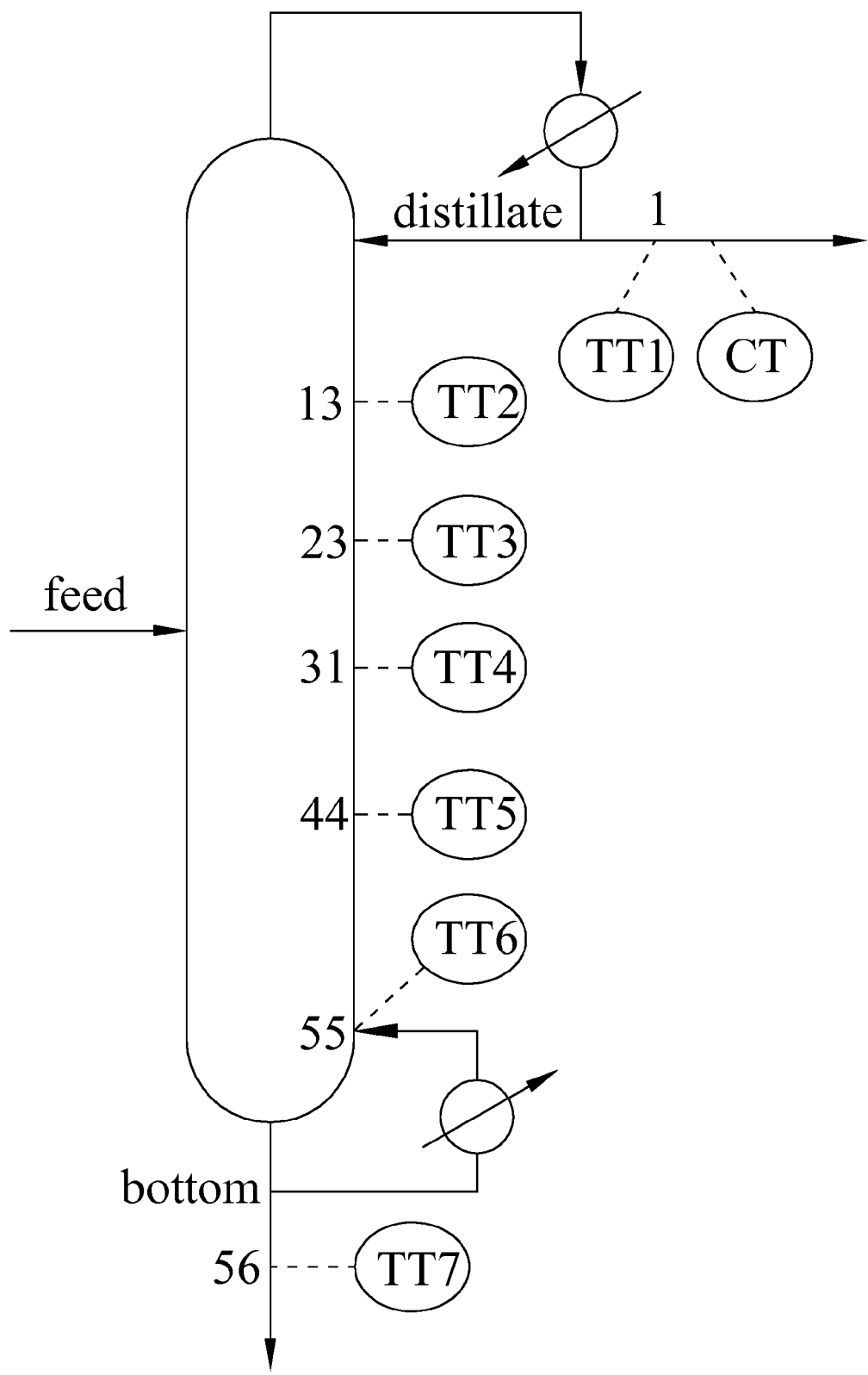
FIG. 4 illustrates a flow chart of one embodiment of a method for building an adaptive soft sensor according to the present invention.

Referring to FIG. 4, there is illustrated a flow chart of one embodiment of a method for building an adaptive soft sensor according to the present invention. Also referring to the following table, there is sequentially shown the composition of feed, distillate and bottom in a nominal operating condition. Distillate and bottom flow rates are 805.4 kmol/h and 113.66 kmol/h, respectively. The diameter of the tray-column is 3 m. The isopropylbenzene (IPB) impurity in the distillate must not exceed 0.5 mol % to prevent the poisoning of the catalyst located in the next unit. In addition, the measurement also suffers from operating perturbations within the column, which result in an uncertain indication of the average quality. To improve IPB control quality, real-time estimation of the IPB impurity is required. As illustrated in FIG. 4, a number of temperature sensors TT1-TT7 were sequentially installed at stages 1, 13, 23, 31, 44, 55 and 56 in the column to monitor overhead IPB impurity. The distillate flow rate was used to control the temperature differences between tray number 23 and tray number 1. In the event that the online gas chromatographs (GC) detect an IPB increase in the top product, the operator would manually increase the heat duty to reduce the impurity of the top product.

| Components | Feed (mol %) | Distillate (mol %) | Bottom (mol %) |
| --- | --- | --- | --- |
| n-Nonane ($Q_1$) | 0.07 | 0.17 | $9.16 \times 10^{-5}$ |
| p-Xylene ($Q_2$) | 0.06 | 0.14 | $1.02 \times 10^{-5}$ |
| m-Xylene ($Q_3$) | 2.1 | 0.51 | $5.42 \times 10^{-5}$ |
| o-Xylene ($Q_4$) | 41.34 | 98.91 | 0.55 |
| Isopropylbenzene ($Q_5$) | 0.63 | 0.25 | 0.90 |
| n-Propylbenzene ($Q_6$) | 1.69 | $5.87 \times 10^{-3}$ | 2.88 |
| 1-Methyl-3-ethylbenzene ($Q_7$) | 8.69 | $9.34 \times 10^{-3}$ | 14.84 |
| 1-Methyl-4-ethylbenzene ($Q_8$) | 3.92 | $1.51 \times 10^{-3}$ | 6.70 |
| 1,3,5-Mesitylene ($Q_9$) | 6.44 | $5.59 \times 10^{-4}$ | 11.00 |
| 1,2,4-Mesitylene ($Q_{10}$) | 21.62 | $5.62 \times 10^{-5}$ | 36.94 |
| 1,2,3-Mesitylene ($Q_{11}$) | 7.61 | 0.00 | 13.00 |
| 1,2,4,5-Tetramethylbenzene ($Q_{12}$) | 1.37 | 0.00 | 2.34 |
| Naphthalene ($Q_{13}$) | 0.80 | 0.00 | 1.37 |
| 1-Methylnaphthalene ($Q_{14}$) | 5.32 | 0.00 | 9.09 |
| n-Decane ($Q_{15}$) | 0.22 | $1.02 \times 10^{-4}$ | 0.38 |

IPB impurity dynamics are simulated using the industrial standard dynamic simulator, ChemCad. The Soave Redlich Kwong (SRK) equation of state is used as the thermodynamic model. The feed, product, and column specifications are the same as those in an industrial case.

Figure 5:
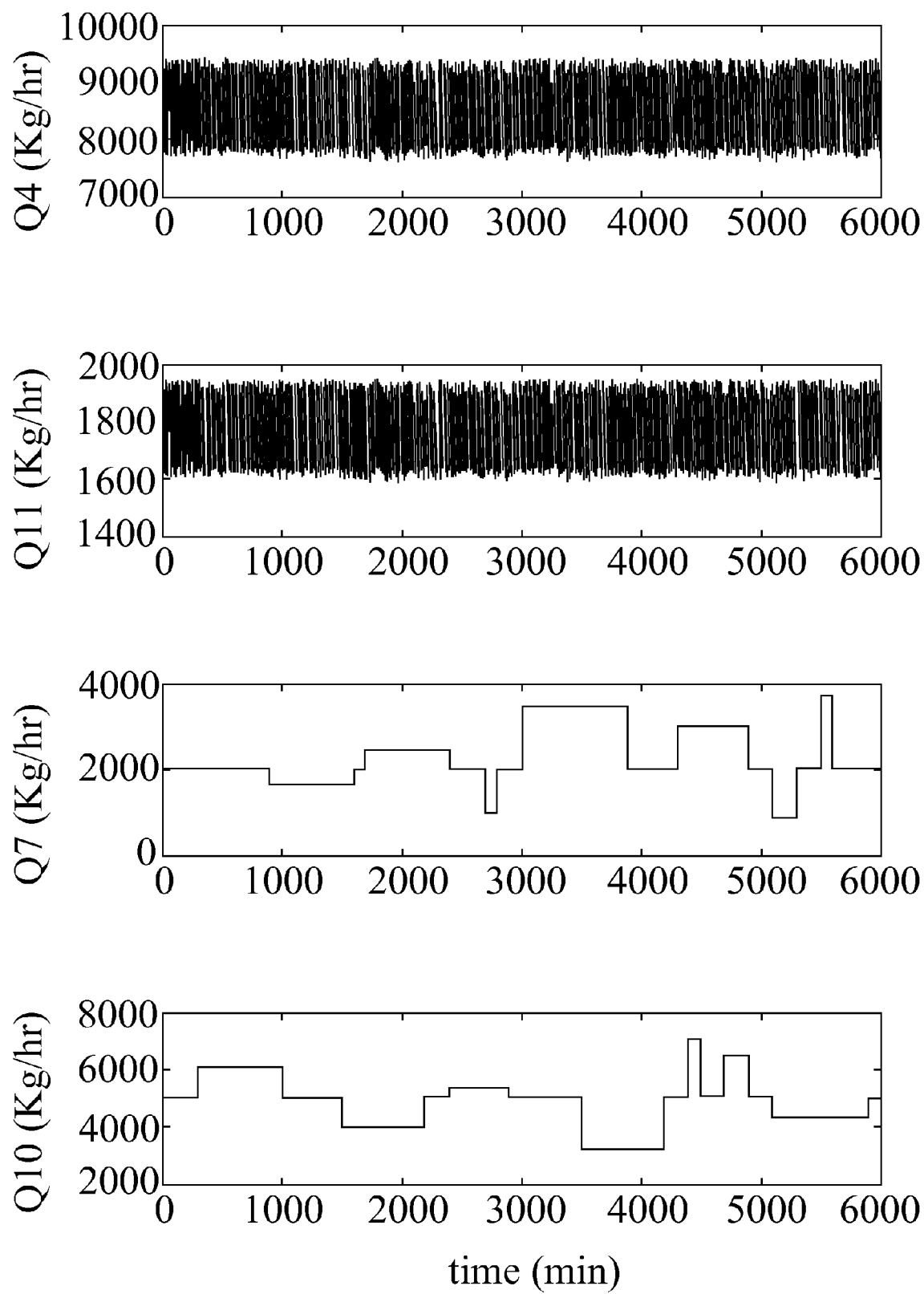
FIG. 5 illustrates a diagram of changes in the flow rates in an embodiment of a method for building an adaptive soft sensor according to the present invention.

Referring to FIG. 5, there is illustrated a diagram of changes in the flow rates in an embodiment of a method for building an adaptive soft sensor according to the present invention. In FIG. 5, the flow rate disturbances of four components are shown as Q4, Q7, Q10 and Q11, respectively.

Figure 6:
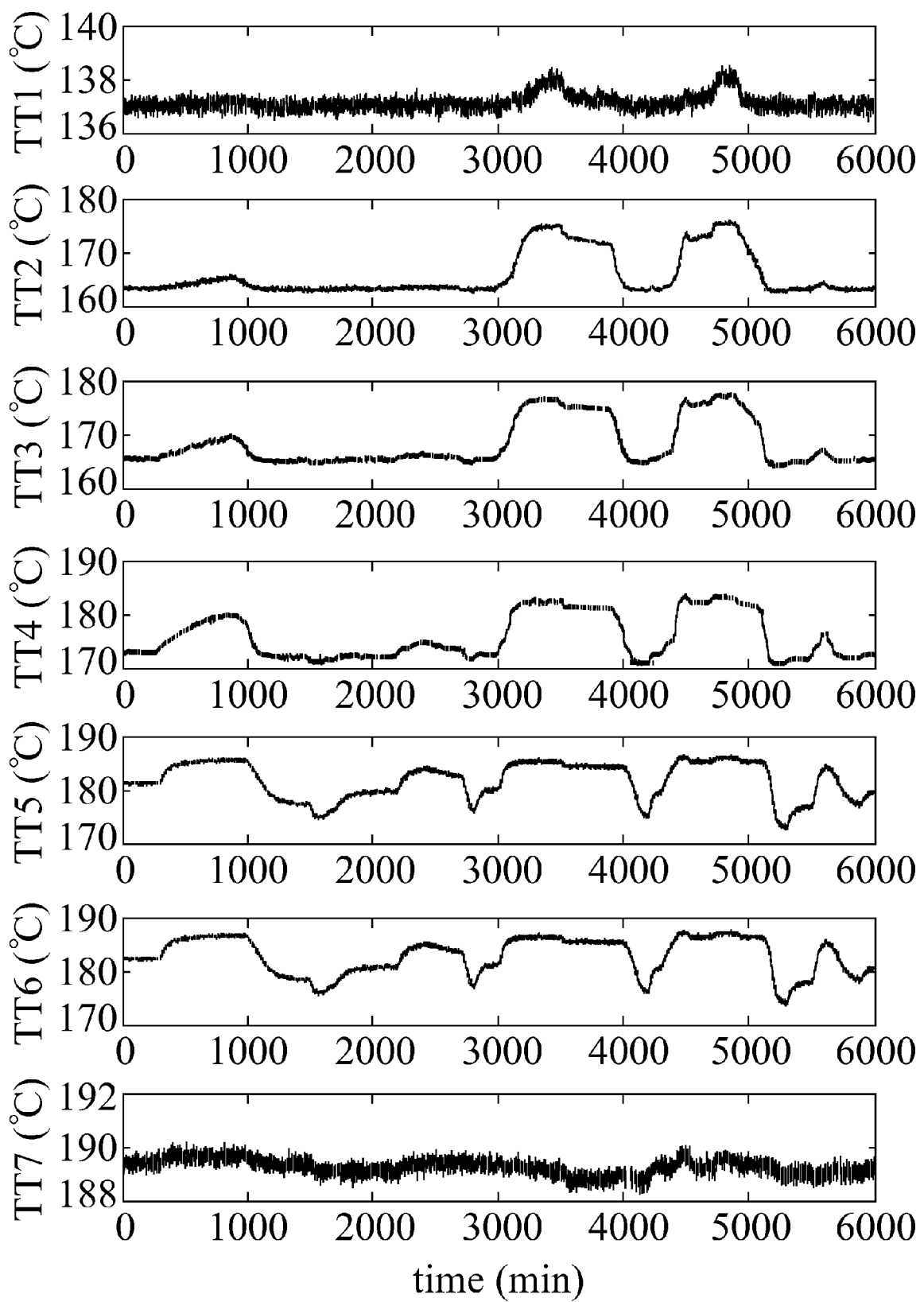
FIG. 6 illustrates a diagram of changes in the temperature profile in an embodiment of a method for building an adaptive soft sensor according to the present invention.

Referring to FIG. 6, there is illustrated a diagram of changes in the temperature profile in an embodiment of a method for building an adaptive soft sensor according to the present invention. The flow rate Q4 of o-xylene and the flow rate Q11 of 1, 2, 3-mesitylene change randomly from −10% to +10% of the nominal steady state values (i.e., Q4 is located in the interval [7671.76, 9376.59] and Q11 is located in the interval [1598.83, 1954.13]). The flow rate Q7 of 1-methyl-1-3-ethylbenzene and the flow rate Q10 of 1, 2, 4-mesitylene were given as a step change at different time intervals, and the flow rates of the other eleven components were maintained in the steady state. Using a fixed step size T=1 min, 6000 sets of input/output data were collected for the simulation.

The temperature measurements from the top to the bottom of the distillation column are labeled as $x_1$, $x_2$, $x_3$, $x_4$, $x_5$, $x_6$, $x_7$, respectively. Since the IPB impurity was measured by an online GC every 5 min in the actual industrial column, the local inferential model can be represented as:

where Y(k)=−ln y(k) is the logarithm of the IPB impurity. The input vector is represented as:

$$X(k) = [1, x_1(5t-1), \ldots x_7(5t-10)]^T,$$

and the scheduling vector is represented as:

$$\phi(k) = [x_1(5t-1), \ldots x_7(5t-10)]^T$$

The subtractive cluster parameters were set as $r_1 = r_2 = 0.21$ and $r_3 = 0.105$, respectively, and the width of the basis function $S_i$ was set to 0.3. Moreover, the input vectors, scheduling vectors, and output vectors were is normalized to have zero mean and near unit variances. To calculate errors, the logarithm of the IPB impurity was converted into an actual mole fraction of IPB.

Figure 7:
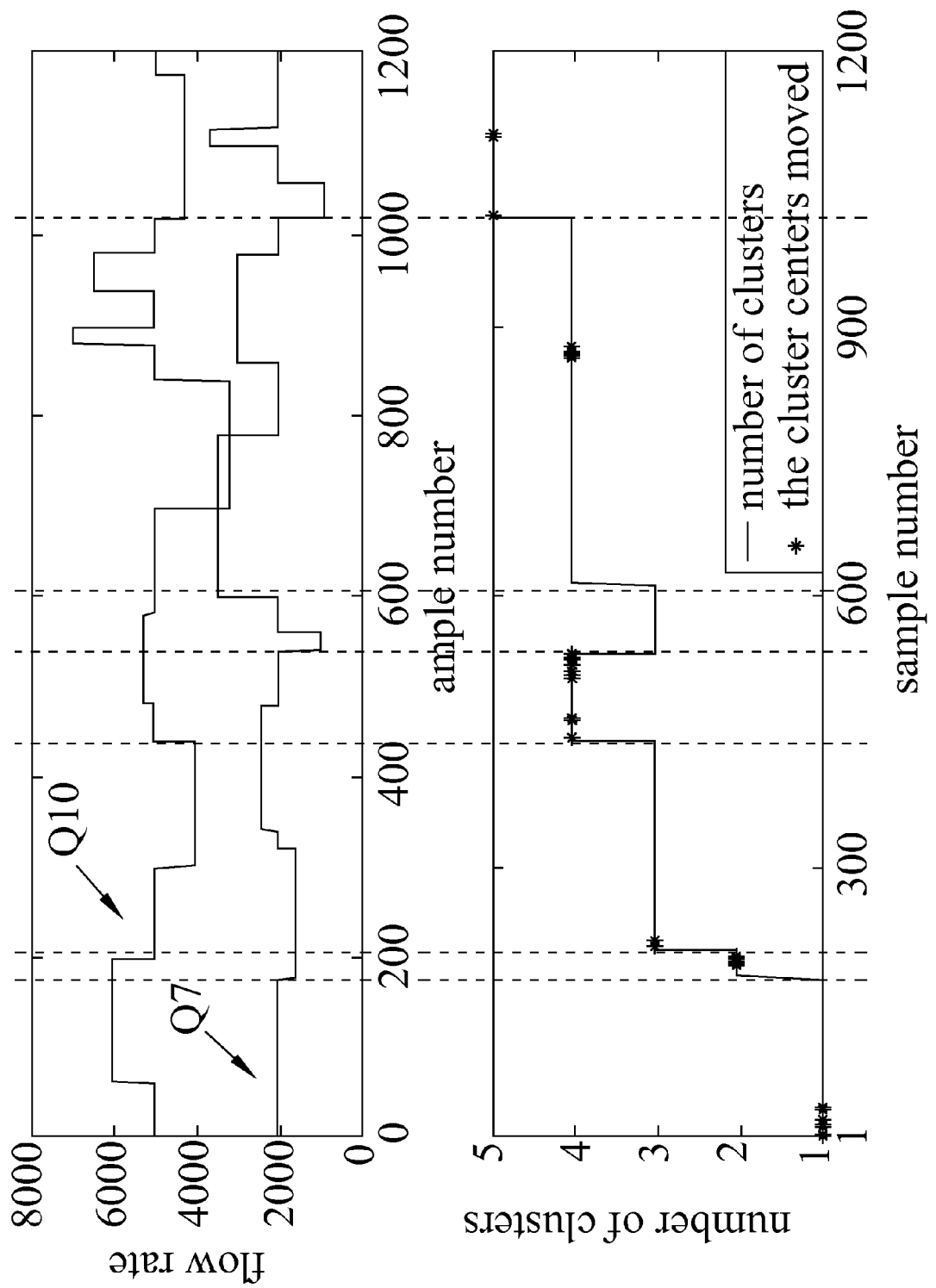
FIG. 7 illustrates a diagram of changes in the number of clusters in an embodiment of a method for building an adaptive soft sensor according to the present invention.

Referring to FIG. 7, there is illustrated a diagram of changes in the number of clusters in an embodiment of a method for building an adaptive soft sensor according to the present invention. From FIG. 7, it can be seen that the step changes in the flow rate of 1-methyl-3-ethylbenzene (Q7) and 1,2,4-mesitylene (Q10) can often cause changes in the number or centers of online clusters. During the simulation period, the cluster centers moved 47 times, the final number of clusters (number of local models) increased to 5, and one cluster merging event occurred in the 541st sampling event.

Figure 8:
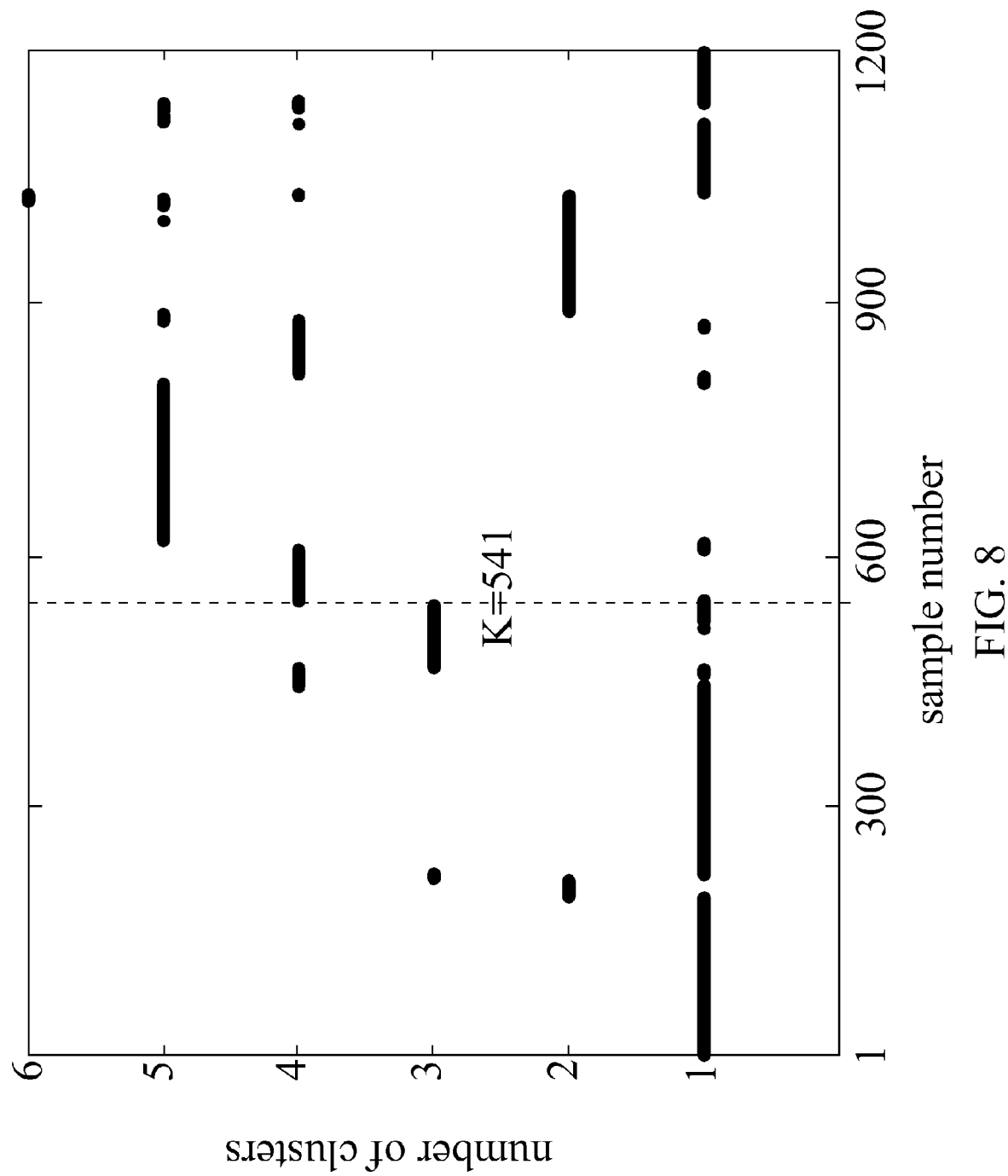
FIG. 8 illustrates a diagram of changes in the number of clusters in an embodiment of a method for building an adaptive soft sensor according to the present invention.

Referring to FIG. 8, there is illustrated a diagram of changes in the number of clusters in an embodiment of a method for building an adaptive soft sensor according to the present invention. In FIG. 8, at the time interval k=541, the No. 3 cluster can be merged into the No. 1 cluster and disappear forever. FIG. 8 shows that the proposed algorithm can indeed closely track the dynamics of IPB impurities even with strange nonlinearities in the distillation column.

Moreover, the present illustrative example employs an evaluation index to determine the prediction accuracy, wherein the evaluation index adopts the mean square error of prediction (MSEP) and average relative error of prediction (AREP). The formula is shown as follows:

$$MSEP = \frac{1}{N} \sum_{k=1}^{N} (y(k) - \hat{y}(k))^2$$

$$AREP = \frac{1}{N} \sum_{k=1}^{n} \left( \frac{|y(k) - \hat{y}(k)|}{y(k)} \right) \times 100\%$$

As mentioned above, we developed this adaptive soft sensor model according to the sampling rates of IPB impurities (every 5 min). To test the performance of this model, the intermediate samples can be predicted using the proposed algorithm.

Figure 9:
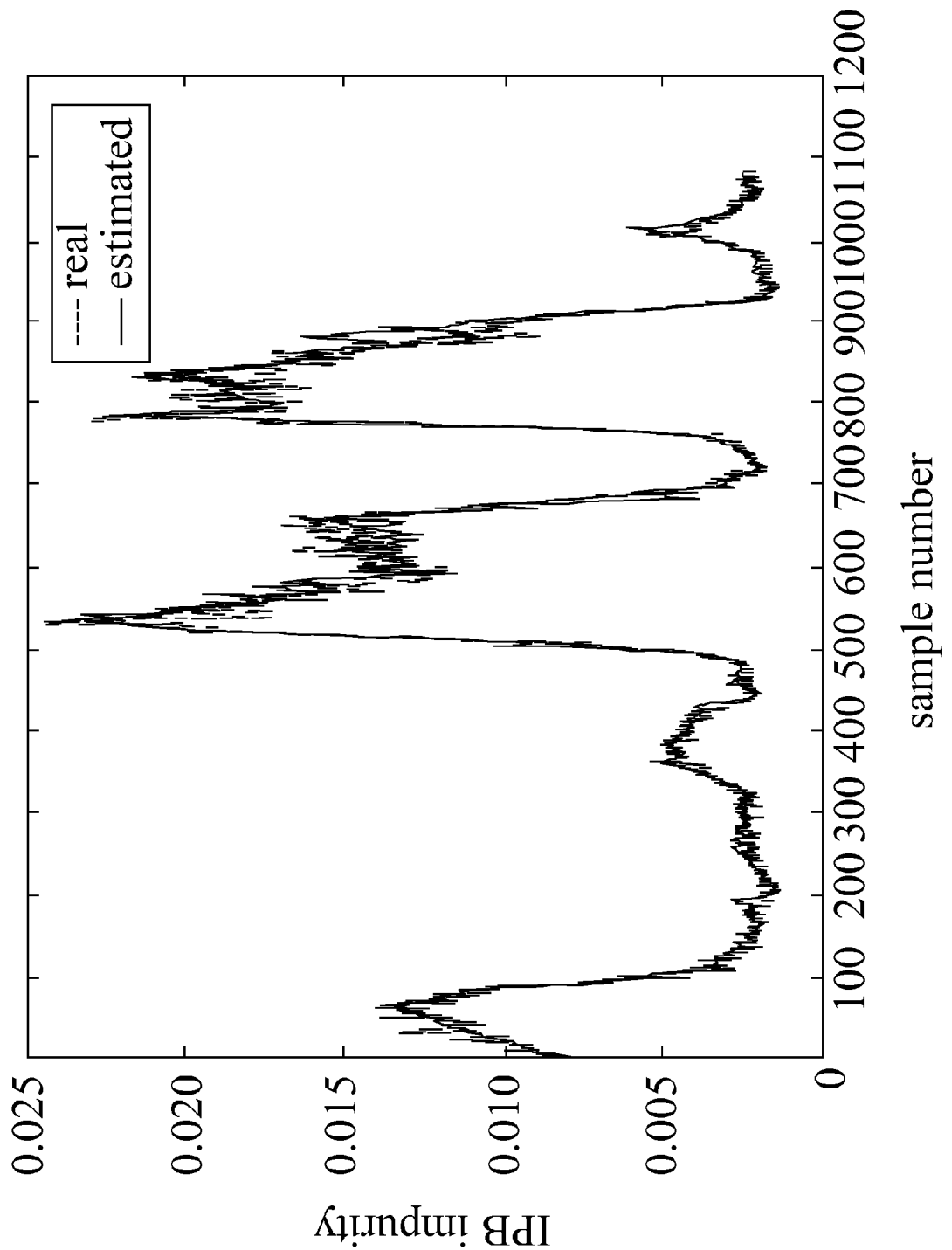
FIG. 9 illustrates a plot of real IPB impurity versus estimated IPB impurity in the simulation example of a method for building an adaptive soft sensor according to the present invention.

Referring to FIG. 9, there is illustrated a plot of real IPB impurity versus estimated IPB impurity in the simulation example of a method for building an adaptive soft sensor according to the present invention. The comparison between the real and estimated IPB impurities is provided as shown in FIG. 9.

Figure 10:
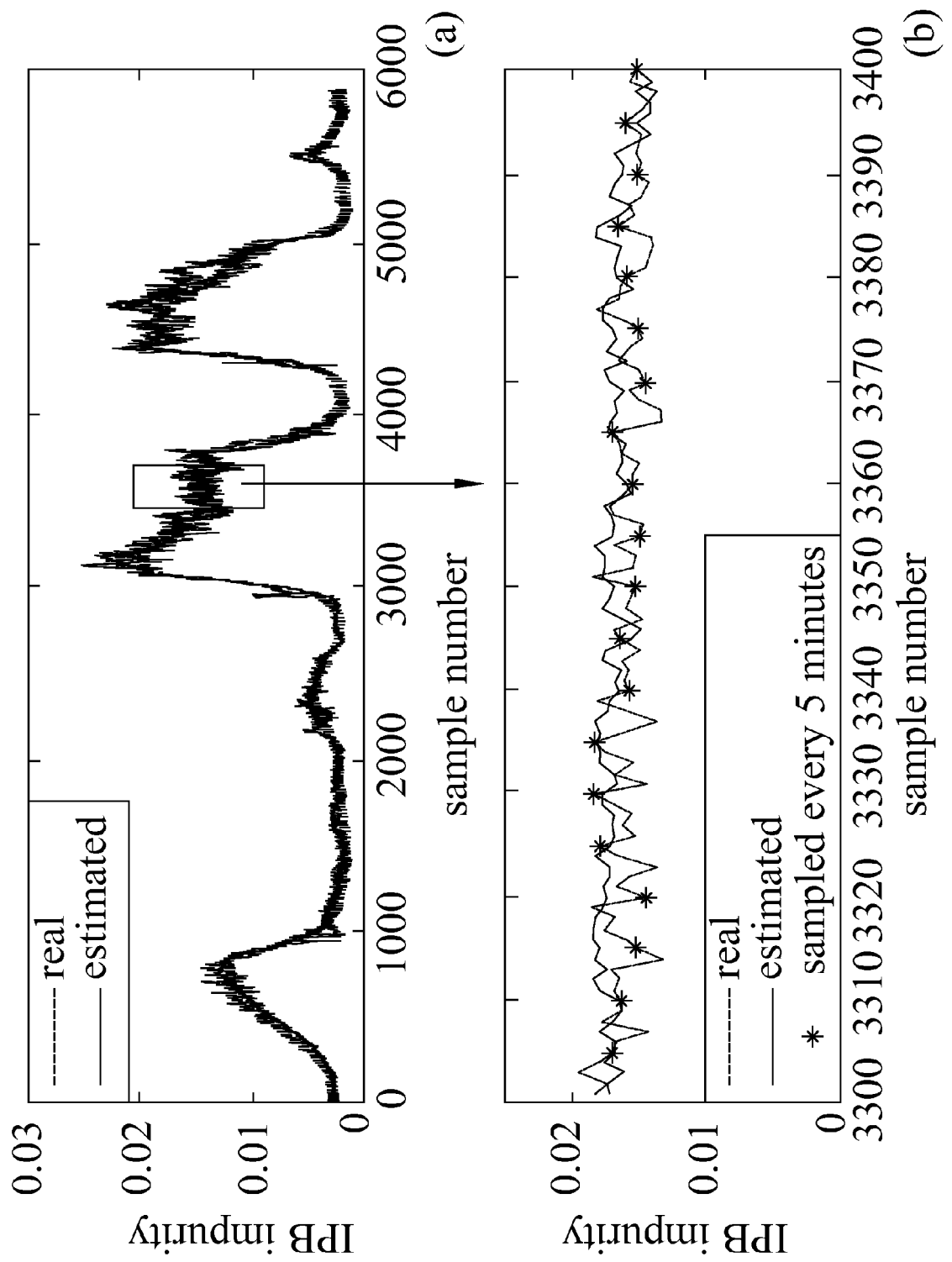
FIG. 10 illustrates a plot of real IPB impurity versus estimated IPB impurity at temperature sampling rates in an embodiment of a method for building an adaptive soft sensor according to the present invention.

Referring to FIG. 10, there is illustrated a plot of real IPB impurity versus estimated IPB impurity at temperature sampling rates in an embodiment of a method for building an adaptive soft sensor according to the present invention. FIG. 10 (a) shows that the model can track the IPB impurity dynamics with 1-min resolution. Moreover, the MSEP was $16.9 \times 10^{-7}$, slightly higher than the result shown in FIG. 9. The detailed result for the sample interval [3301, 3400] is shown in FIG. 10 (b).

The method for building an adaptive soft sensor can eliminate the recording of redundant data by adding, updating and merging clusters. Thus, it does not need much memory space to process the method and can be more flexibly applied to various industrial processes.

The above description is illustrative only and is not to be considered limiting. Various modifications or changes can be made without departing from the spirit and scope of the invention. All such equivalent modifications and changes shall be included within the scope of the appended claims.

What is claimed is:

1. A method for building an adaptive soft sensor, comprising the following steps:
using a distributed control system (DCS) for sampling and inspecting a manufacturing process;
using sensors configured in the distributed control system to obtain online data for recording process variables to form input vectors of an interferential model;
using the distributed control system to preprocess the online data to remove approximately identical data records and/or remove the data records that out of a reasonable range in order to be meaningful for model generation and optimization;
operating an online subtractive cluster algorithm to divide the online data into a plurality of local regions according to a schedule vector, which is a sub set of the input vectors, and the plurality of local regions compose of a plurality of clusters;
building a linear model in each of the local regions, and constructing the inferential model based on each of the linear models;
converting the online subtractive cluster algorithm into a recursive regression algorithm;
calculating density of the schedule vector with $$P_\Phi = \frac{\kappa - 1}{(k-1)(\gamma(k)+1) - 2\eta(k)\phi(k) + \sigma(k)},$$

where $P\phi$ is the density of the scheduled vector k is a time interval, $\gamma$ is the covariance of scheduling vector at the current sampling time k, which denotes the current change of soft sensors, $\eta$ is the accumulation of changes of the scheduling vector for the past sampling time $1, 2, \ldots k-1$, which denotes the past change of soft sensor, $\sigma$ is the accumulation covariance of scheduling vector for the past sampling time $1, 2, \ldots k-1$, which denotes the known knowledge of soft sensors $\phi$ is the schedule vector, $\gamma(k) = \phi(k)^T \phi(k)$, $$\eta(k) = \sum_{j=1}^{k-1} \phi(j)^T = \eta(k-1) + \phi(k-1)^T,$$

$$\sigma(k) = \sum_{j=1}^{k-1} \phi(j)^T \phi(j) = \sigma(k-1) + \phi(k-1)^T \phi(k-1);$$

merging two nearest clusters, updating existing clusters or adding a new cluster to eliminate the recording of the redundant online data for saving memory space of the distributed control system, wherein merging two nearest clusters, updating existing clusters or adding the new cluster further comprise:
merging two nearest clusters into a new cluster when the two cluster centers are closer than a threshold;
updating existing clusters; while obtaining new online data; and
adding the new cluster when the new online data is far away from the plurality of clusters already exist;
operating the recursive regression algorithm to update a plurality of local models in real-time according to the linear model of the local regions; and
obtaining a predicted output value by using each of the linear models.

2. The method for building an adaptive soft sensor according to claim 1, wherein the sub set is constructed by read and normalized sampled-variables or sampled-variables of a system.

3. The method for building an adaptive soft sensor according to claim 1, wherein the recursive regression algorithm is a recursive least square algorithm.

4. The method for building an adaptive soft sensor according to claim 3, wherein the input vector is classified by the corresponding schedule vector, and the selected local model is updated by the recursive least square algorithm using the input vector.

5. The method for building an adaptive soft sensor according to claim 1, wherein the center, covariance matrix, and parameters of each of the leaner models are stored as knowledge in the inferential model.

6. The method for building an adaptive soft sensor according to claim 1, wherein the sensors comprises temperature sensors and gas chromatograph.

* * * * *